SUBSCRIPTION-TYPE TELEVISION RECEIVER

Filed Sept. 30, 1948 2 Sheets-Sheet 1

JESSE E. BROWN
*INVENTOR.*

BY [signature]
HIS AGENT

SUBSCRIPTION-TYPE TELEVISION RECEIVER

Filed Sept. 30, 1948 2 Sheets-Sheet 2

JESSE E. BROWN
*INVENTOR.*

BY Bruce L Birchard

HIS AGENT

Patented Sept. 11, 1951 2,567,545

UNITED STATES PATENT OFFICE 2,567,545

SUBSCRIPTION-TYPE TELEVISION RECEIVER

Jesse E. Brown, Glencoe, Ill., assignor to Zenith Radio Corporation, a corporation of Illinois Application September 30, 1948, Serial No. 52,079

4 Claims. (Cl. 178—5.1)

This invention relates to subscriber television systems in which image signals are transmitted in coded form on a first channel, and key signals for decoding the coded image signals are transmitted solely to subscriber receivers on a second channel.

It is an object of this invention to provide such a subscriber television system, in which the audio signals which accompany the coded image signals are also coded, such coding being effected by means of frequency conversion of the audio signals by a coding signal, and in which such audio signals are transmitted in coded form for reproduction solely in subscriber receivers.

Another object of this invention is to provide a subscriber receiver for use in such a system, which receiver decodes received coded image signals upon the receipt of suitable decoding key signals, and which receiver further decodes received coded audio signals accompanying the image signals by frequency reconversion of the coded audio signals by a suitable decoding signal synchronized with the above mentioned coding signal.

Figure 1:
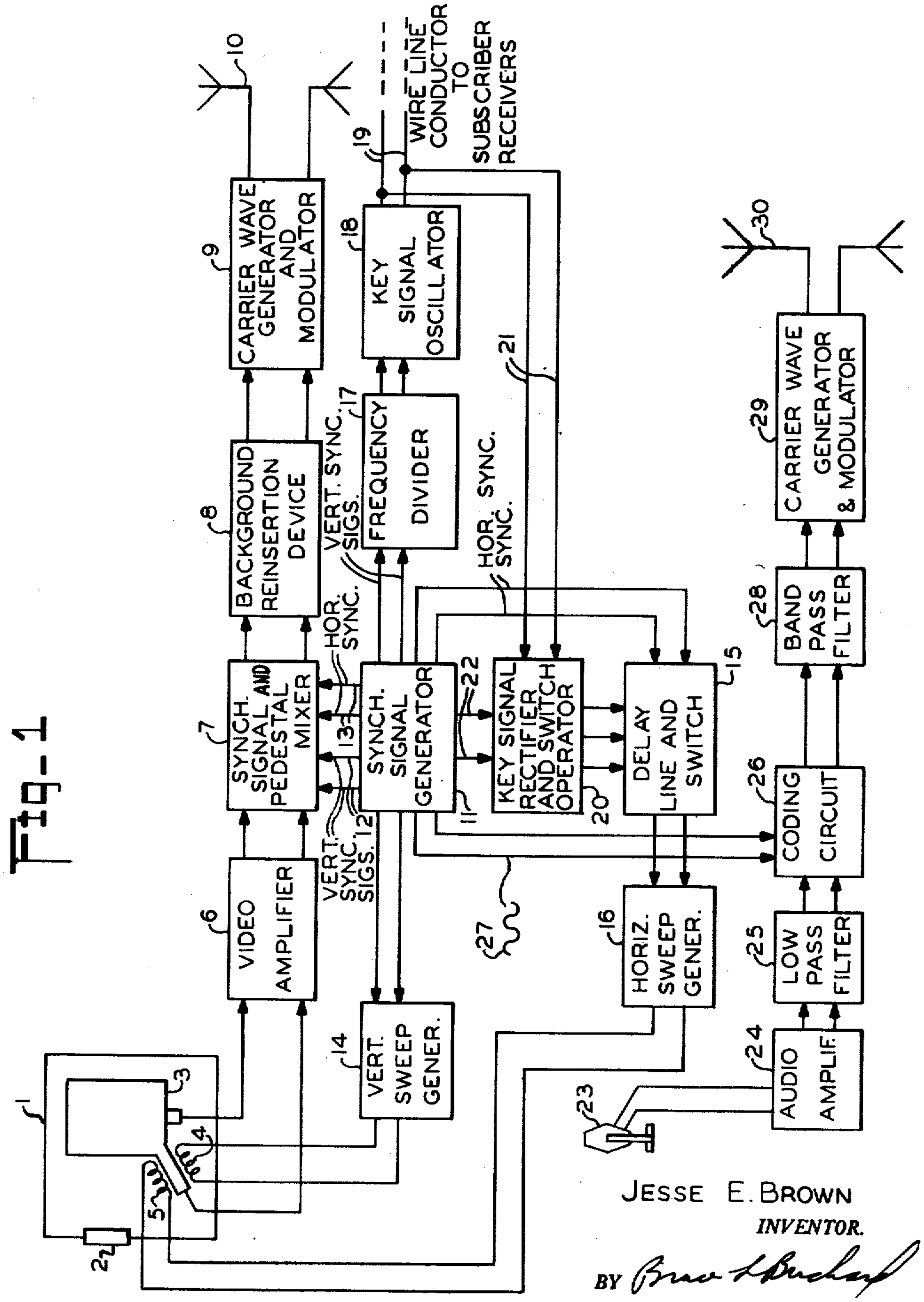
Figure 2:
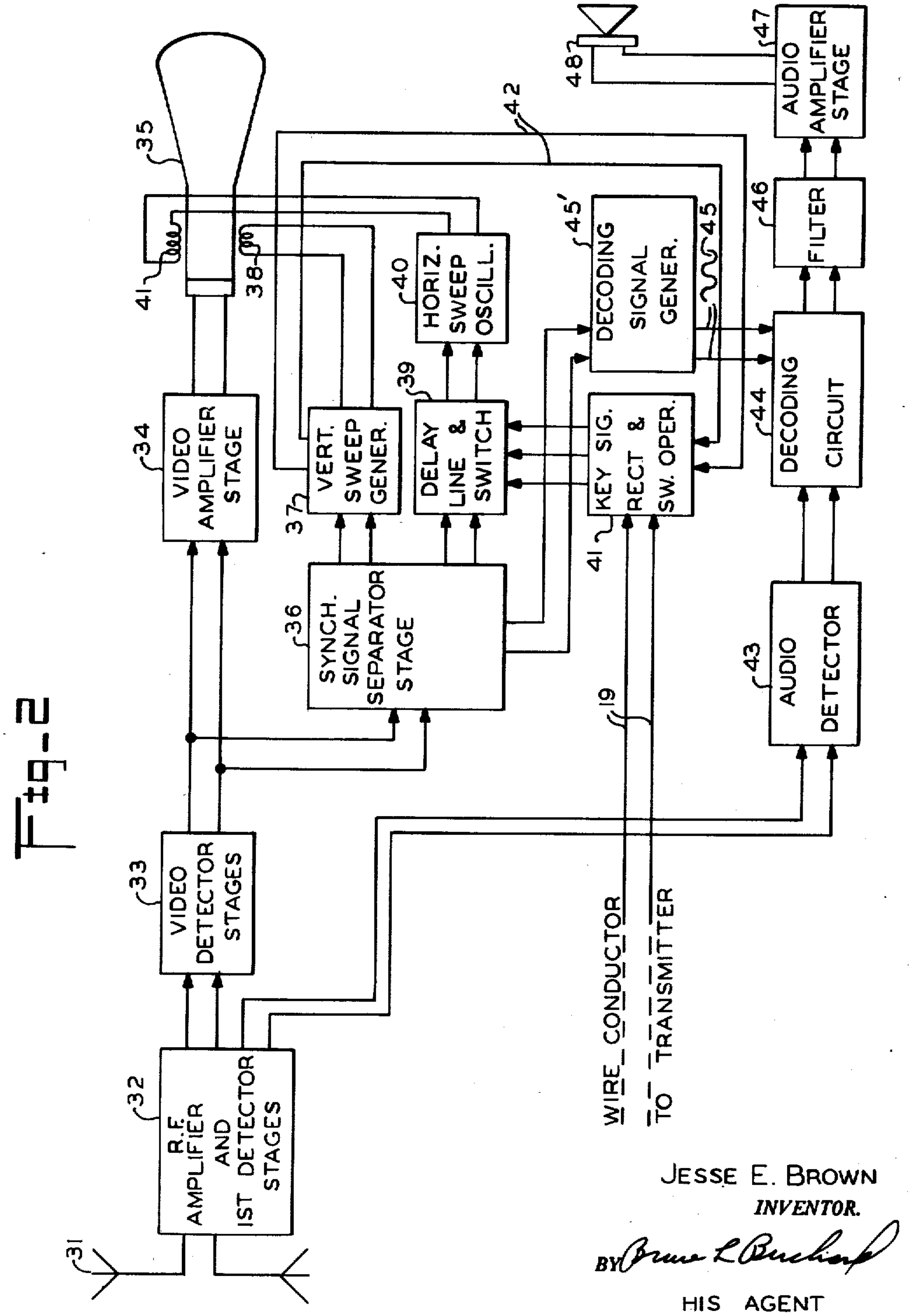

The features of this invention which are believed to be new are set forth with particularity in the appended claims. The invention itself, however, together with further objects and advantages thereof may best be understood by reference to the following description when taken in conjunction with the accompanying drawings, in which:

Figure 1 shows a television system for transmitting coded audio and coded image signals, and Figure 2 shows a receiver for decoding and reproducing the coded audio and coded image signals received from the transmitter of Figure 1.

Application Serial No. 742,374, Ellett et al., entitled "Radio Wire Signalling System," filed April 18, 1947, which has now issued as Patent 2,510,046, May 30, 1950, and application Serial No. 773,848, Roschke, entitled, "Image Transmission System" filed September 13, 1947, which has now issued as Patent 2,547,598, April 3, 1951, both assigned to the present assignee, disclose and claim various television systems in which the image signal portion of the television signal is transmitted in coded fashion to subscriber receivers for reproduction in these receivers upon the receipt of decoding key signals. It is contemplated in the present invention to provide in such systems a circuit for coding the audio signal portion of the television signal, which audio signal portion may be decoded only in subscriber receivers.

Figure 1 shows a system including an arrangement for coding the image signal portion of a television signal. The illustrated arrangement is similar to that disclosed in the aforementioned application Serial No. 773,848, although any of the image signal coding systems disclosed in the previously mentioned applications may be used. The system of Figure 1 also includes an arrangement for coding the audio portion of the television signal in accordance with the present invention. The resulting television signal, consisting of coded image and coded audio signals, transmitted by this system may be reproduced solely in subscriber receivers to which appropriate key signals are being supplied. The various components of the systems of Figures 1 and 2 have been described fully in application Serial No. 773,848 or are quite conventional, and a detailed description thereof is believed to be unnecessary.

In Figure 1, a television camera 1 contains the usual lens system 2 for focusing an image upon an iconoscope, or image orthicon 3, which iconoscope is provided with the usual vertical scanning coil 4 and horizontal scanning coil 5. Video signals developed by the iconoscope 3 are amplified in video amplifier 6 and are subsequently transmitted to a synchronizing signal and pedestal mixer 7, in which pedestals and synchronizing signals are added to the video signals. The signals from mixer 7 are then transmitted through a background re-insertion device 8 to a carrier wave generator and modulator 9, in which the video signals, properly adjusted as to background level, are modulated on a carrier wave which is radiated from antenna 10.

Normal vertical and horizontal synchronizing signals are generated by synchronizing signal generators 11, and these signals are impressed on mixer 7 by way of leads 12 and 13 respectively. Vertical synchronizing signals from generator 11 are applied to vertical sweep generator 14, the sweep signal output of which is impressed across vertical sweep coil 4 of iconoscope 3. Horizontal synchronizing signals from generators 11 are applied through delay line and switch 15 to horizontal sweep generator 16, the sweep output of generator 16 being impressed across the horizontal sweep coil 5 of iconoscope 3.

Vertical synchronizing signals from generators 11 are frequency divided in frequency divider 17, these frequency divided signals being utilized to trigger key signal oscillator 18. A burst of sine wave key signal is derived from oscillator 18 in response to each frequency divided pulse applied thereto, and the key signal is transmitted to subscriber receivers over conductor 19, which conductor may be telephone lines, power lines, or the like. The key signal is also applied to rectifier and switch operator 20 by way of leads 21, each burst of key signal being rectified in stage 20 and conditioning this stage to actuate a switch in delay line and switch 15 in response to vertical synchronizing signals applied to stage 20 by way of leads 22. In this manner, as fully described in application Serial No. 773,848, the key signal causes the delay line and switch 15 to delay the horizontal synchronizing signal passing therethrough at various intervals, thus causing the horizontal scanning of iconoscope 3 to be delayed at such intervals. In this manner, the image signals are transmitted in a coded fashion, which coding comprises delaying the video signals at certain intervals with respect to the transmitted horizontal synchronizing signals.

The audio signals associated with the image signals to make up the complete television signal are obtained from microphone 23, and these audio signals are amplified in audio amplifier 24. The amplified audio signals are passed through low pass filter 25 to a coding circuit 26. The function of circuit 26 is to code the audio signals by converting the frequencies thereof in a certain manner. To accomplish this, a coding signal 27, preferably in the form of a sine wave synchronized with the horizontal synchronizing signals, is obtained from synchronizing signal generators 11. It is evident that coding signal 27 may be obtained from a separate generator, this generator being synchronized with the horizontal synchronizing signals, or some harmonic thereof. Circuit 26 may be of any known type, and when this circuit is such that the output thereof consists of the audio signals modulated on the signal 27, this output is passed through a band pass filter 28, which filter suppresses the signal 27 and preferably the lower side band of the audio signals modulated thereon. The upper side band, which contains the audio signal frequencies in inverted sequence, is modulated on a suitable carrier wave in carrier wave generator and modulator 29, which carrier wave is radiated by antenna 30. In the present instance, low pass filter 25 would be so designed that only frequencies below the frequency of signal 27 are passed thereby, to avoid interference with the upper side band signals modulated on the carrier wave in stage 29. The signal 27 may, when so desired, be frequency multiplied to a frequency which places the side bands of the modulated output of circuit 26 outside the audio frequency range, and filter 28 designed to suppress the frequency multiplied signal, and pass either the upper or lower side bands containing the audio signals, or both, which side bands are modulated on the carrier wave in stage 29. Furthermore, when desired, circuit 26 may be of the balanced modulator type which suppresses signal 27 and yields solely the desired side bands, and the band pass filter 28 may be designed to suppress one of these side bands or may be eliminated. Hence, the audio signals are transmitted in converted or coded form, it being necessary to reproduce the signal 27 at the receiver to decode these signals.

In the receiver of Figure 2, television signals are received on antenna 31, and these signals are amplified and mixed with a local oscillator signal in conventional radio frequency amplifier and first detector stages 32. When the receiver is tuned to receive a coded television signal, such as transmitted by the transmitter of Figure 1, the video portion of this signal is detected in video detector stage 33, and the detected video signal is amplified in video amplifier stages 34 and applied to a usual cathode ray receiver image tube 35. Synchronizing signals are separated from the received signal in separator stage 36, and vertical and horizontal synchronizing signals are obtained from this stage. The vertical synchronizing signals from stage 36 are applied to vertical sweep generator 37, and the sweep output of this generator is applied to vertical scanning coil 38 of image tube 35. Horizontal synchronizing signals from separator stage 36 are applied through delay line and switch 39 to horizontal sweep generator 40, and the sweep output of this generator is impressed on horizontal scanning coil 41 of image tube 35. The delay line and switch 39 is operated to delay the horizontal synchronizing signals passing therethrough at intervals when the video signals in the received coded television signal are similarly delayed. Hence, the received television signals are decoded, and tube 35 reproduces these signals. The delay line and switch 39 is operated by key signal rectifier and switch operator 41, which operator is actuated by the action of the key signal received on conductor 19, and vertical blanking pulses from the vertical sweep generator 37 received over leads 42, in a manner fully described in aforementioned application Serial No. 773,848.

The coded audio signals contained in the received television signal are detected in audio detector 43, and the detected audio signals are impressed on decoding circuit 44. A decoding signal 45 having the same frequency, and phase as signal 27 of Figure 1 is also impressed on circuit 44. The signals 45 and 27 are preferably sine waves. The signal 45 is obtained from decoding signal generator 45′, this generator being synchronized by the horizontal synchronizing signals from separator 36 in the usual manner. The detected audio signals are decoded in decoding circuit 44 by the frequency reconverting action of signal 45, and the decoded audio signals are passed through a filter 46, which filter removes all but the signals corresponding to the original audio signal. The signals passed by filter 46 are amplified in audio amplifier stage 47 and reproduced in signal translating device 48. Decoding circuit 44 may be of any known type, such as disclosed in copending application Serial No. 52,909 entitled, "Coded Sound Signalling System," George O. Striker, filed October 5, 1948, now Patent No. 2,551,668, granted May 1, 1951, and assigned to the present assignee.

This invention therefore provides in a coded subscriber television system, a simple audio signal coding system for adding to the difficulty of unauthorized interception of the subscriber television signals. In the above described system the coding signal at the transmitter and the decoding signal at the receiver are synchronized by means of the horizontal synchronizing signals. However, it is obvious that the vertical synchronizing signals or other synchronizing signals included in the television signal might also be used, when so desired.

While certain specific embodiments of the invention have been shown and described, modifications may be made without departing therefrom. The appended claims are intended to cover all such modifications as fall within the true spirit and scope of the invention.

I claim:

1. A subscription type of television receiver for utilizing an image modulated signal including synchronizing-signal components and for further utilizing a coded audio modulated signal received concurrently with said image signal and coded in accordance with a continuous-wave coding signal synchronized with said synchronizing-signal components, said receiver comprising: an image-reproducing device and an associated scanning system; apparatus for supplying the image information of said image modulated signal to said reproducing device; a synchronizing-signal separator coupled to said apparatus for deriving said synchronizing-signal components of said image-modulated signal for application to said scanning system; a sound-reproducing device; means, including a decoding circuit, for supplying the audio information of said audio modulated signal to said sound-reproducing device; and a decoding-signal generator coupled to said synchronizing-signal separator and responsive to said synchronizing components of said image-modulated signal for developing and supplying to said decoding circuit a continuous-wave decoding signal synchronized as to frequency and phase with said continuous-wave coding signal.

2. A subscription type of television receiver for utilizing an image modulated signal including synchronizing-signal components and for further utilizing an audio modulated signal received concurrently with said image signal and modulated with audio information frequency-converted in accordance with a continuous-wave coding signal synchronized with said synchronizing-signal components, said receiver comprising: an image-reproducing device and an associated scanning system; apparatus for supplying the image information of said image modulated signal to said reproducing device; a synchronizing-signal separator coupled to said apparatus for deriving said synchronizing-signal components of said image-modulated signal for application to said scanning system; a sound-reproducing device; circuit means for supplying the audio information of said audio modulated signal to said sound-reproducing device; a decoding circuit included in said circuit means and responsive to an applied signal for re-converting said audio information; and a decoding-signal generator coupled to said synchronizing-signal separator and responsive to said synchronizing-signal components of said image modulated signal for developing and supplying to said decoding circuit a continuous-wave decoding signal synchronized as to frequency and phase with said continuous-wave coding signal.

3. A subscription type of television receiver for utilizing a coded image modulated signal including synchronizing-signal components and for further utilizing an audio modulated signal received concurrently with said coded image signal and coded in accordance with a continuous-wave coding signal synchronized with said synchronizing-signal components, said receiver comprising: an image-reproducing device and an associated scanning system; apparatus for supplying the image information of said image modulated signal to said reproducing device; a synchronizing-signal separator coupled to said apparatus for deriving said synchronizing-signal components of said image-modulated signal for application to said scanning system; a first decoding circuit coupled to said scanning system for decoding said image modulated signal; a sound-reproducing device; circuit means for supplying the audio information of said audio modulated signal to said sound-reproducing device; a second decoding circuit included in said circuit means and responsive to an applied signal for decoding said coded audio signal; and a decoding-signal generator coupled to said synchronizing-signal separator and responsive to said synchronizing-signal components of said image modulated signal for developing and supplying to said second decoding circuit a continuous-wave decoding signal synchronized to frequency and phase with said continuous-wave coding signal.

4. A subscription type of television receiver for utilizing a coded image modulated signal including synchronizing-signal components, and an audio modulated signal received concurrently with said coded image signal and modulated with audio information frequency-converted in accordance with a continuous-wave coding signal synchronized with said synchronizing-signal components, and for further utilizing a key signal indicating the coding schedule of said image signal and received over a line circuit, said receiver comprising: an image-reproducing device and an associated scanning system; apparatus for supplying the image information of said image modulated signal to said reproducing device; a synchronizing-signal separator coupled to said apparatus for deriving said synchronizing-signal components of said image-modulated signal for application to said scanning system; a first decoding circuit included in said scanning system and coupled to said line circuit for decoding said image signal in response to said key signal; a sound-reproducing device; circuit means for supplying the audio information of said audio modulated signal to said sound-reproducing device; a second decoding circuit included in said circuit means and responsive to an applied signal for reconverting said audio information; and a decoding-signal generator coupled to said synchronizing-signal separator and responsive to said synchronizing-signal components of said image modulated signal for developing and supplying to said second decoding circuit a continuous-wave decoding signal synchronized as to frequency and phase with said continuous-wave coding signal.

JESSE E. BROWN.

REFERENCES CITED

The following references are of record in the file of this patent:

UNITED STATES PATENTS

| Number | Name | Date |
|---|---|---|
| 2,227,108 | Roosenstein | Dec. 31, 1940 |
| 2,251,525 | Rosenthal | Aug. 5, 1941 |
| 2,266,194 | Guanella | Dec. 16, 1941 |
| 2,268,001 | Felgel-Farnholz | Dec. 30, 1941 |
| 2,335,983 | Wilson | Dec. 7, 1943 |
| 2,394,917 | Kallmann | Feb. 12, 1946 |
| 2,402,067 | Mathes | June 11, 1946 |
| 2,403,059 | Dillenback | July 2, 1946 |
| 2,405,252 | Goldsmith | Aug. 6, 1946 |
| 2,419,568 | Labin | Apr. 29, 1947 |
| 2,477,625 | Labin | Aug. 2, 1949 |
| 2,477,679 | Young | Aug. 2, 1949 |

FOREIGN PATENTS

| Number | Country | Date |
|---|---|---|
| 564,511 | Great Britain | Jan. 7, 1943 |